United States Patent Office.

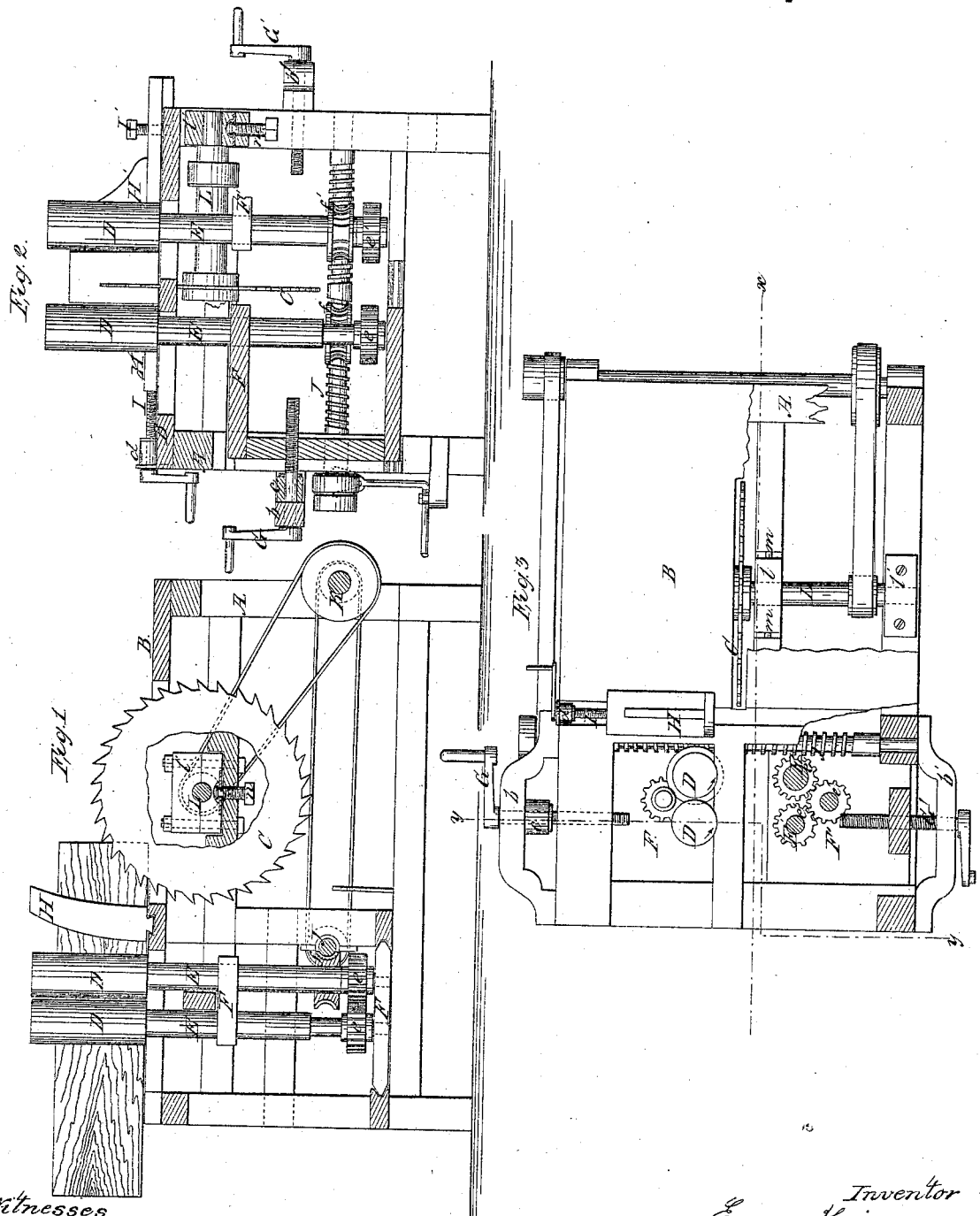

EDWIN WESCOTT, OF HUDSON CITY, NEW JERSEY.

Letters Patent No. 63,679, dated April 9, 1867.

---

IMPROVEMENT IN SAWING MACHINES.

---

The Schedule referred to in these Letters Patent and making part of the same.

---

TO ALL WHOM IT MAY CONCERN:

Be it known that I, EDWIN WESCOTT, of Hudson, in the county of Hudson, and State of New Jersey, have invented a new and improved Re-Splitting Machine; and I do hereby declare that the following is a full, clear, and exact description thereof, which will enable others skilled in the art to make and use the same, reference being had to the accompanying drawings, forming part of this specification, in which—

Figure 1 represents a longitudinal vertical section of this invention, the line $x$ $x$, fig. 3, indicating the plane of section.

Figure 2 is a transverse section of the same, taken in the plane indicated by the line $y$ $y$, fig. 3.

Figure 3 is a sectional plan or top view thereof.

Similar letters of reference indicate like parts.

This invention relates to an improvement in the feed-gear of a re-splitting machine, the feed-rollers being so arranged that each pair can be moved in and out by turning a screw or other suitable means, and at the same time the connection between the feed-rollers and the driving-gear remains unbroken, said connection being effected by an endless screw, which gears in worm-wheels on the shafts of two of the feed-rollers in such a manner that the motion of said feed-rollers remains unchanged, whatever the position of the feed-rollers may be. One jaw of the gauge, and one pair of feed-rollers are rendered yielding by adjustable cushions placed on thin set-screws, so that they can readily accommodate themselves to the varying width of the timber to be cut. The boxes of the saw-arbor are so arranged that by means of a set-screw the saw can be brought in an oblique position.

A represents a frame, which is made of wood or any other suitable material, and which supports a table, B, on which the timber rests while being acted upon by the saw C. The timber is fed towards the saw by the motion of two pairs of feed-rollers D D', which form the heads of upright spindles E E', and which in practice will be fluted. The spindles E E' have their bearings in carriages F F', which slide back and forth in suitable guide-ways in the frame A, so that the feed-rollers can be moved towards or from each other, as may be desired. The motion of the carriages is produced by hand-screws G G', which pass through bridges $b$ $b'$, and are tapped into the uprights of said carriages, and the hand-screw G of the carriage F is provided with an elastic cushion, $e$, so that the rollers D are rendered yielding, and enabled to accommodate themselves to the varying width of the timber to be re-split. The feed-rollers D', however, are rigid, so as to preserve a uniform width of that part which is to be cut off. In addition to the feed-rollers D D', gauges H H' are employed, whereby the timber is kept steady while the saw acts on it. These gauges are adjusted by hand-screws I I', and the gauge H, which is on the same side with the feed-rollers D, is rendered yielding by an elastic cushion, $d$, attached to its hand-screw, while the gauge H' is rigid, the same as the rollers D'. The rollers D are geared together by cog-wheels $e$, which are arranged so that said rollers revolve in one and the same direction, and on the arbor of that one of these rollers which is nearest to the saw a worm-wheel, $f$, is mounted, which gears in a screw-spindle, J. The rollers D' are geared together by cog-wheels $e'$ in the same manner as the rollers D, and a worm-wheel, $f'$, mounted on the arbor of one of said rollers, gears also in the screw-spindle J. One-half of this screw-spindle is provided with a right-handed and the other with a left-handed screw-thread, the right-handed thread being in gear with the worm-wheel $f$, and the left-handed thread with the worm-wheel $f'$, so that by imparting to the screw-spindle a revolving motion, the feed-rollers D D' are caused to revolve in opposite directions, as indicated by the arrows marked thereon in fig. 3. The screw-spindle receives its motion from the driving-shaft K, and by its action on the rollers D D' the desired feed-motion is produced. At the same time, said screw-spindle does not prevent the carriages F F' being moved towards or from each other, for if the carriages are moved, the worm-wheels, by being in gear with the screw-spindle, are caused to revolve, and the motion of the carriage can be effected without difficulty. The saw C is mounted on a spindle, I, which has its bearings in boxes $l$ $l'$, as shown particularly in fig. 3. The box $l$ is hung on gudgeons $m$, so that it can accommodate itself to the position of the spindle, and the box $l$ is supported by a screw, $n$, the upper end of which forms a ball, that fits into a corresponding socket in the box, so that, by turning said screw, the box can be raised or lowered; and, at the same time, said box is allowed to accommodate itself to the position of the saw-spindle. By this arrangement of the boxes I am enabled to set the saw in a vertical and in an oblique plane, according to the nature of the articles to be cut; and a machine for re-splitting wood is obtained which can be used with great advantage for a variety of work.

Having thus described my invention, I claim as new, and desire to secure by Letters Patent—

1. The screw-spindle J, and worm-wheels $f\ f'$, in combination with the feed-rollers D D', constructed and operating substantially as and for the purpose described.

2. The adjustable boxes $l\ l'$, gudgeons $m$, set-screws $n$, and saw-spindle L, when constructed and arranged as herein set forth for the purpose specified.

EDWIN WESCOTT.

Witnesses:
    WM. F. MCNAMARA,
    W. HAUFF.